US008223728B2

(12) United States Patent
Westphal et al.

(10) Patent No.: US 8,223,728 B2
(45) Date of Patent: Jul. 17, 2012

(54) COMBINED SCHEDULING AND NETWORK CODING FOR WIRELESS MESH NETWORKS

(75) Inventors: Cedric Westphal, San Francisco, CA (US); Ying Ye, Mountain View, CA (US); Kevin Tang, Dublin, CA (US); Naheed Vora, Santa Clara, CA (US); Meghana Sahasrabudhe, Sunnyvale, CA (US)

(73) Assignee: Nokia Corporation (FI)

( * ) Notice: Subject to any disclaimer, the term of this patent is extended or adjusted under 35 U.S.C. 154(b) by 1212 days.

(21) Appl. No.: 11/696,649

(22) Filed: Apr. 4, 2007

(65) Prior Publication Data

US 2008/0247407 A1 Oct. 9, 2008

(51) Int. Cl.
*H04W 4/00* (2009.01)
*H04L 12/28* (2006.01)
*H04B 7/216* (2006.01)

(52) U.S. Cl. .......................... 370/338; 370/406; 370/342
(58) Field of Classification Search .................. 370/406, 370/338, 342
See application file for complete search history.

(56) References Cited

U.S. PATENT DOCUMENTS

2002/0067736 A1 6/2002 Garcia-Luna-Aceves et al.
2007/0147322 A1* 6/2007 Agrawal et al. ............... 370/338

FOREIGN PATENT DOCUMENTS

WO WO 2007/008163 1/2007

OTHER PUBLICATIONS

Sachin Katti, et al., "XORs in the Air: Practical Wireless Network Coding", XP-002493001, Sep. 15, 2006.*
Westphal, Combined Scheduling and Network Coding for Wireless Mesh Networks, Nokia Technical Report, Oct. 2006.
International Search Report from International Application No. PCT/IB2008/051256, dated Sep. 5, 2008.

* cited by examiner

*Primary Examiner* — Kamran Afshar
*Assistant Examiner* — Omoniyi Obayanju
(74) *Attorney, Agent, or Firm* — Banner & Witcoff, Ltd.

(57) ABSTRACT

An architecture by which combined scheduling and network coding can be used in mesh networks, and more particularly wireless mesh networks. In various embodiments, this architecture includes a scheduling MAC protocol for scheduling nodes in the mesh network in order to take advantage of network coding opportunities. The schedule takes advantage of these opportunities by assigning a gain to transmit packets based upon the number of packets that are transmitted concurrently and choosing a schedule which minimizes the gain over the scheduling horizon. Regarding the assigned gain, in one embodiment this value is one for basic non-encoded operations and two or more for encoded operations. A scheduling MAC protocol is also used to announce and arbitrate network coding opportunities by indicating which packets (as characterized by their transmission slot) are to be encoded with each other.

19 Claims, 4 Drawing Sheets

COMBINED SCHEDULING AND NETWORK CODING FOR WIRELESS MESH NETWORKS

FIELD OF THE INVENTION

The present invention relates generally to mesh networks. More particularly, the present invention relates to systems for reducing interference and increasing bandwidth in mesh networks.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Mesh networks can be used to route data, voice and instructions between individual nodes. Mesh networking allows for continuous connections and reconfigurations around broken or blocked paths by "hopping" from one node to another until a desired destination is reached. In mesh networks, component parts can connect to each other via multiple hops. Mesh networks are also "self-healing" in the sense that, even when a node becomes inoperable and/or unusable for some reason, the network can still operate by reconfiguring the hop path. FIG. 1 is a representation of a plurality of nodes 100 which are configured to form one such mesh network 110.

Mesh networks are being deployed in a wide range of situations and can often be used in place of cellular network architectures. One particular application for mesh networks involves using the networks for backhauling metropolitan wireless networks of WiFi access points. A well-engineered mesh network for the backhaul is the basis for the successful implementation of such networks.

It is preferable that such mesh networks be operable within WiFi frequency bands for the access traffic. However, 802.11 Media Access Control (MAC) performs poorly in mesh networks for backhaul traffic. This poor performance is due to the high overhead of congestion management and channel acquisition. Nodes in wireless mesh networks cannot transmit simultaneously without interfering with each other. This reduces the overall performance of the air interface by adding a delay to "win" a contention for the channel, and by reducing bandwidth due to the time division of the channel between different users.

For the above reasons, a number of scheduling protocols have been designed for allocating transmission time slots to each node in the backhaul mesh network. In one such time-division multiple access system, during a time slot allocated to a transmission, both the sender and the transmitter can communicate free from interference, as the other potentially interfering users are not permitted to transmit during this time slot.

Another method for arbitrating the contention of the medium is to reduce the number of accesses to the channel. Network coding reduces the number of transmitted packets by encoding two packets at a relay point in the network. A basic type of such an architecture is as follows. In a backhaul network consisting of A, B and a gateway G, if A sends a packet P1 to G, and G sends a packet P2 to A, then B will relay the packets. In this situation, the total number of channel access is four (one for P1 from A to B, one from B to G, and, in the other direction, one for P2 from G to B and one from B to A). In its most basic form, network coding suggests that, after receiving P1 from A and P2 from G, B should broadcast P1xP2 (where x denotes the XOR operation) to both A and G. A and G can then each recover P2 and P1 respectively, based on the packet they sent to B and the packet they received from B. The number of channel accesses is reduced from 4 to 3, leveraging the broadcast nature of the air interface. This type of network coding is discussed, for example in "*XOR in the air: practical network coding*, Katti et al, Sigcomm 2006." However, implementation of this type of system can lead to potential "fairness" issues.

SUMMARY OF THE INVENTION

Various embodiments of the present invention provide an improved architecture by which combined scheduling and network coding can be used in mesh networks, and more particularly wireless mesh networks. According to various embodiments, a scheduling MAC protocol is used to schedule nodes in the mesh network in order to take advantage of network coding opportunities. The scheduler takes advantage of the coding opportunities by assigning a gain to transmit packets based on the number of packets transmitted concurrently (one for a basic, non-encoded operation, and two or more for an encoded mode), and choosing a schedule which minimizes the gain over the scheduling horizon. A scheduling MAC protocol is used to announce and arbitrates network coding opportunities by indicating which packets (as characterized by their transmission slot) are to be encoded with which other packet. In one embodiment, a centralized entity is used to allocate time slots and encoding opportunities, based upon a MAC such as the "RoofTop" MAC developed by Nokia Corporation and now part of the IEEE 802.16-2004 standard. The centralized entity can be replaced in some implementations by a distributed algorithm. Distributed encoding clients are used to buffer, encode and decode packets at each node.

In various embodiments of the present invention, contentions are arbitrated so that no individual contention phase is required. Additionally, the number of transmissions—and therefore the interference—is limited by having the packets encoded in order to combine several transmissions inside one transmission attempt. Various embodiments also make use of the promiscuous nature of the air interface by simultaneously transmitting to different users at the same time.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
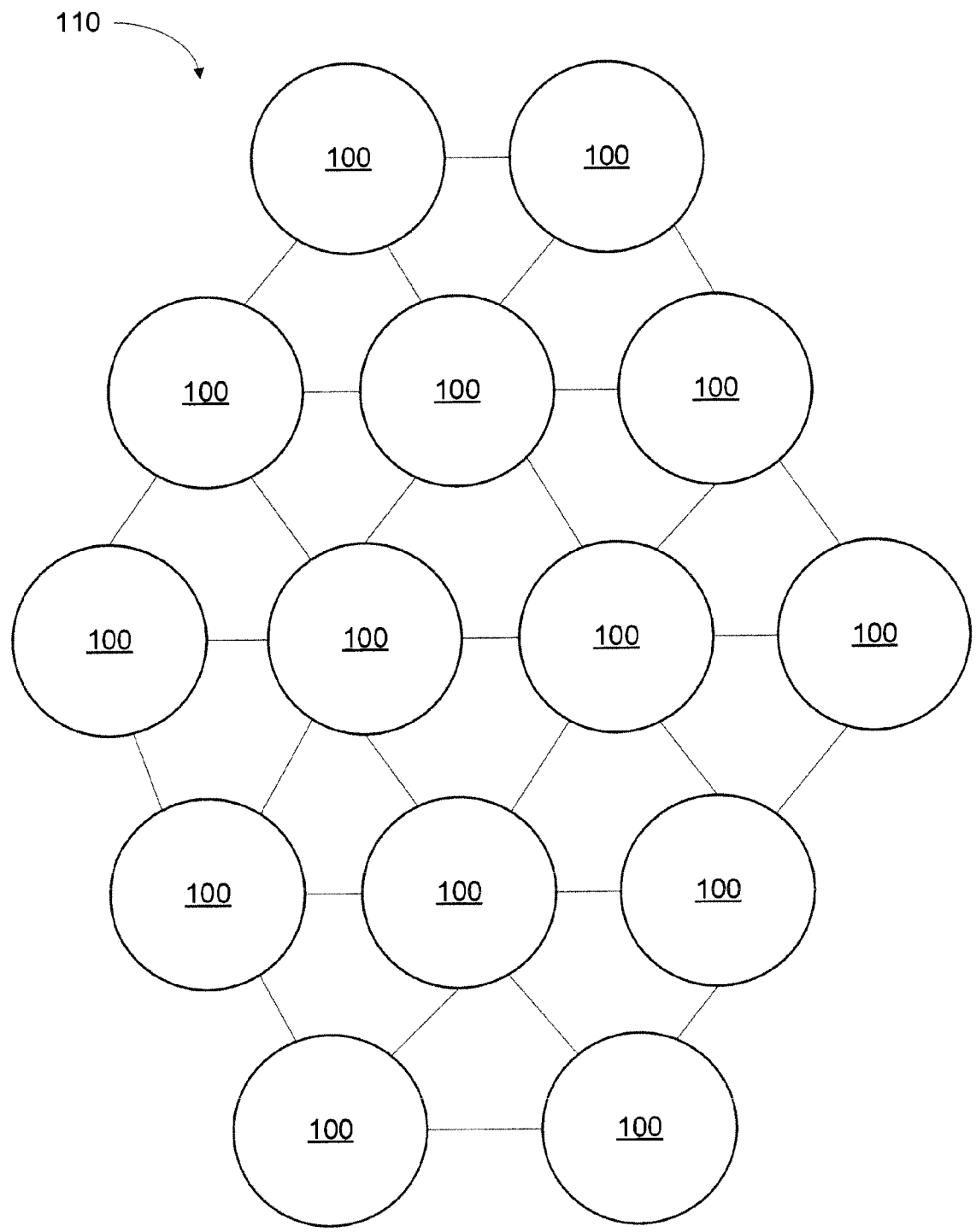
FIG. 1 is a representation of an exemplary mesh network within which various embodiments of the present invention may be implemented.
Figure 2A:
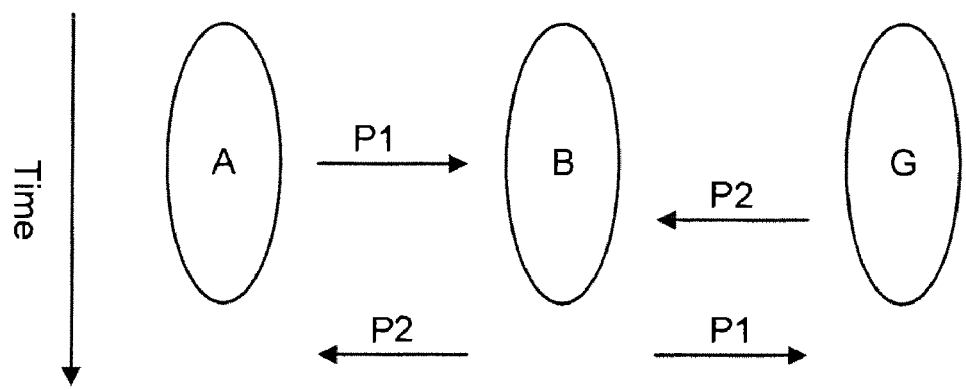
FIG. 2(a) shows the process by which packets are transmitted between a node A and a Gateway G, without the use of network coding.
Figure 2B:
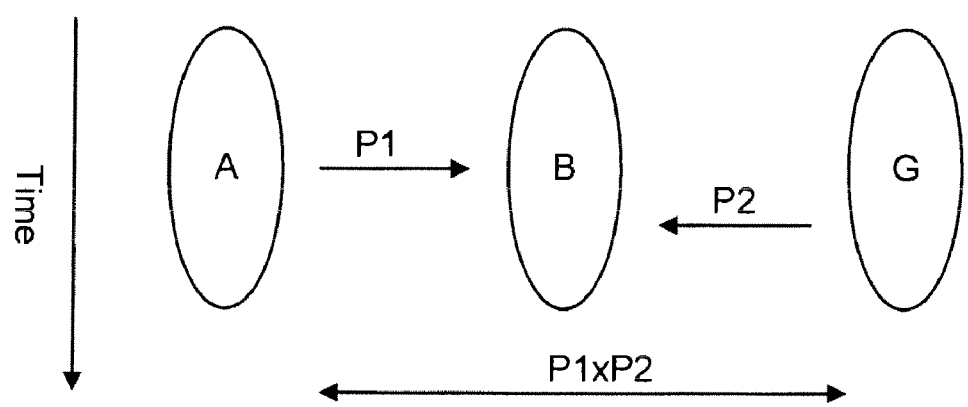
FIG. 2(b) shows a process by which the same packets may be transmitted with network coding.

Various embodiments of the present invention provide an improved architecture by which combined scheduling and network coding can be used in mesh networks, and more particularly wireless mesh networks. In various embodiments of the invention, this architecture includes a scheduling MAC protocol for scheduling nodes in the mesh network in order to take advantage of network coding opportunities. The schedule takes advantage of these opportunities by (1) assigning a gain to transmit packets based upon the number of packets that are transmitted concurrently and (2) choosing a schedule which minimizes the gain over the scheduling horizon. Regarding the assigned gain, in one embodiment this value is one for basic non-encoded operations and two or more for encoded operations. A scheduling MAC protocol is also used to announce and arbitrate network coding opportunities by indicating which packets (as characterized by their transmission slot) are to be encoded with each other.

In one embodiment of the invention, a centralized entity is used to allocate time slots and encoding opportunities. These actions can be based upon one of a number of MAC protocols. One such MAC is the "RoofTop" MAC developed by Nokia Corporation. The "Rooftop" Network uses a common control channel and multiple data channels to reduce interference among different transmissions. In other implementations, this centralized entity is replaced with a distributed algorithm. Lastly, distributed encoding clients are used to buffer, encode and decode packets at each node.

The following is a more detailed description of a combined scheduling and encoding architecture according to one embodiment of the present invention.

One algorithm for optimizing scheduling so as to maximize the coding of packets and to minimize the use of resources is the Schedule Tree Optimized Radio MAC (STORM) protocol. For the STORM algorithm, it is helpful to consider a time horizon T which is divided in transmission slots. It is assumed that the nodes are time synchronized (using a network time scheduler, for example) and the network consists of N nodes. N denotes both the number of nodes and the set of nodes i∈N. The STORM protocol schedules the slots to different nodes based on their aggregated demands on the uplink and downlink. It assigns a number of time slots $x_{ij}$ to the link between node i and j which solves the linear program:

Maximize $$\min(S_i), \forall i \in N$$

where $$S_i = \Sigma x_{ij}/D_i \forall j \text{ where } x_{ij} \text{ is connected to } i$$

subject to the constraint $$\Sigma x_{ij} \leq F_i, \forall j \text{ where } x_{ij} \text{ is connected to } Fi \quad (1)$$

$F_i$ is both the number of slots left after scheduling the parents of nodes i above i in the tree rooted at the gateway, and the set of links which has not been scheduled yet at node i. $D_i$ corresponds to the demand of user i expressed as the sum of its download and upload request from its intrinsic traffic and the requests from its neighboring nodes. $S_i$ represents the satisfaction of user i—the higher $S_i$, the larger the ratio of the achieved throughput over the requested demand. A ratio of 1 would mean that the whole traffic at node i has been satisfied by the network. The STORM protocol ensures a level of fairness by attempting to maximize the minimal satisfaction among all nodes. In the ideal case, the STORM protocol provides the same satisfaction to all nodes when it allocates the capacity of the shared medium.

The procedure achieved to find the above schedule is just one example procedure, as other scheduling policies exist which would provide a different schedule with different characteristics. The above schedule is a max min policy, meaning that it optimizes for the worst case, and thus attempts to capture both throughput maximization goals and fairness enforcement goals. In any event, the end result of the scheduling process is a vector $x_{ij}$ which assigns a fraction of the scheduling horizon T to the link (i, j) and assigns these links to time slots in the scheduling time frame.

The above scheduling procedure is discussed in further detail herein, but it should be noted that other procedures, including but not limited to centralized procedures, can also be used. For example, a distributed schedule can be generated at all nodes, allocating R some transmission times and some reception times. If one packet is transmitted per slot, the order of transmission packet is indifferent at node R. However, to ensure that some encoding occurs, R should schedule its transmission opportunity after the reception of packets from A and B. This can be accomplished in a distributed manner once R knows the slots which are available for transmission and reception.

Figure 3:
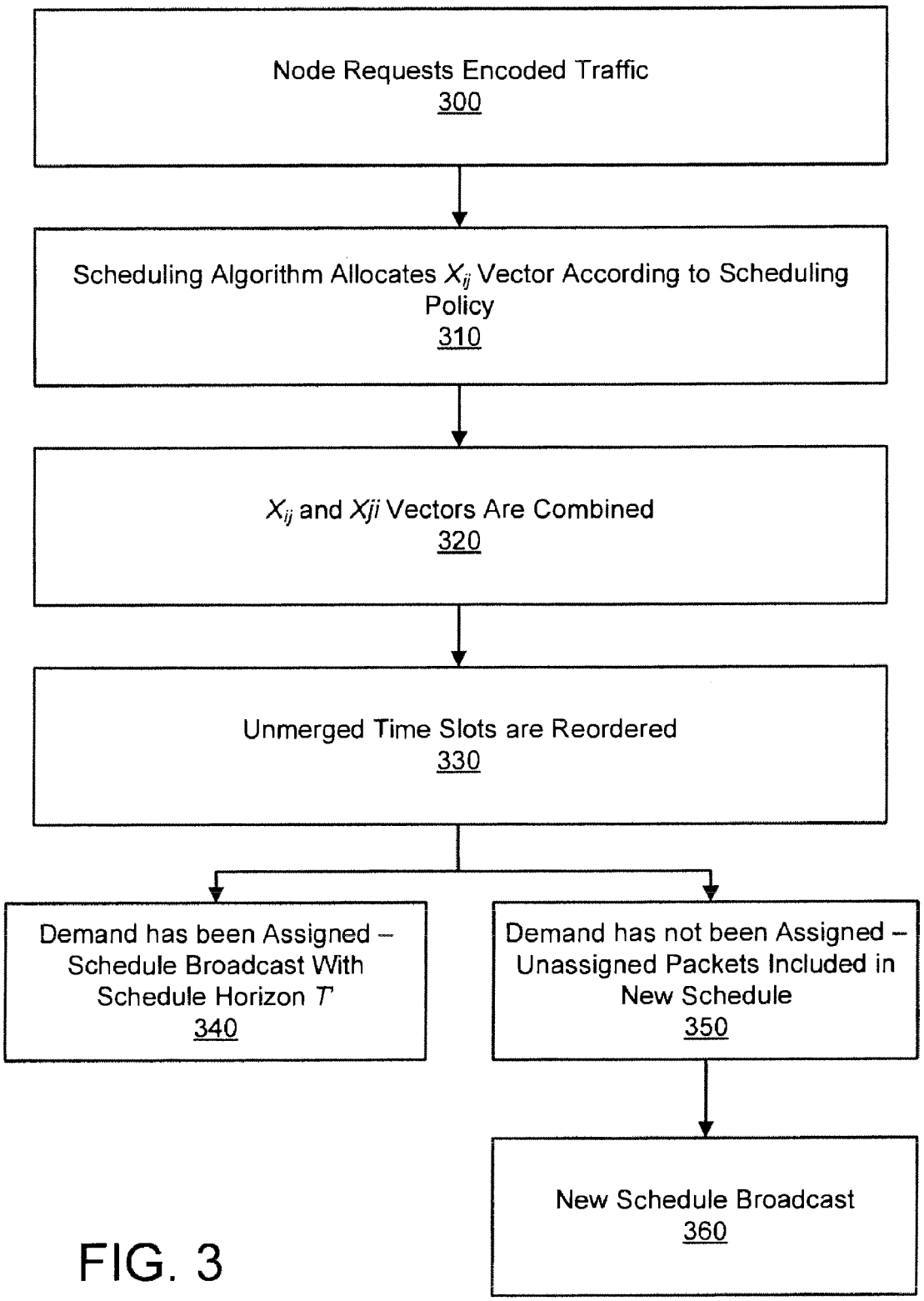
FIG. 3 is a flow chart showing the processes involved in a scheduling procedure according to various embodiments of the present invention.

The following is one example of how the scheduling procedure may be modified. FIG. 3 is a representation of this procedure. First and at 300, a node i which requests both a quantity $u_i$ of uplink traffic and a quantity $d_i$ of downlink traffic will request $e_i=\min(u_i, d_i)+\delta$ of encoded traffic, where δ is some encoding overhead, plus $r_i=\max(u_i, d_i)-\min(u_i, d_i)$ of unidirectional traffic. The total demand $D_i$ stays the same in the fairness computation, i.e., $D_i=2e_i+r_i$. At 310, the scheduling algorithm allocates the $x_{ij}$ according to the underlying scheduling policy. $x_{ij}$ and $x_{ji}$ are then combined at 320 according to the $e_i$—a slot allocated to the directional link (j, i) is merged with a slot allocated to link (j, k) where i is uplink of j and k downlink. This frees time slots in the schedule.

At this point and as represented at 330, the $x_{ij}$ time slots which have not been merged are re-ordered so as to create encoding opportunities. This is accomplished by ordering an uplink flow into j with a downlink flow into j prior to forwarding the uplink traffic out of j. This is computed by searching through the potential permutations of the scheduling algorithm and finding the permutation with the maximal transmission gain. The transmission gain is computed as how many transmission requests are economized by utilizing a newly created encoding opportunity. If all of the demand has been assigned, the schedule is then broadcast at 340 with a new scheduling horizon T' instead of T. If some packets were not scheduled in the original time slots, however, they are included in the new schedule at 350. Packets which maximize the transmission gain, as defined above, are included in priority. The new schedule is then transmitted at 360.

Defining an optimal schedule which takes into account the encoding gain is considered to be an NP-hard problem, which the problem is addressed herein using the STORM protocol, which is computable. A list of permutations is then considered, which is solvable in a polynomial time for a given time horizon. This ensures that the algorithm is computable and implementable.

Different encoding protocols can be used with the above scheduling procedure. One such protocol is discussed in S. Katti, H. Rahul, W. Hu, D. Katabi, M. Medard and J. Crowcroft, *XORs In The Air: Practice Wireless Network Coding*, in Proc. Of ACM SIGCOMM 2006. This protocol can be used since it is at the packet layer, while the scheduling protocol only works at the MAC layer. The scheduling protocol described herein ensures that the upper layer encoding protocol has the most data to encode, but it does not impose any constraints in the design of the encoding protocol. However, a number of different protocols may be used based upon the particular needs of the implementers.

Figure 4:
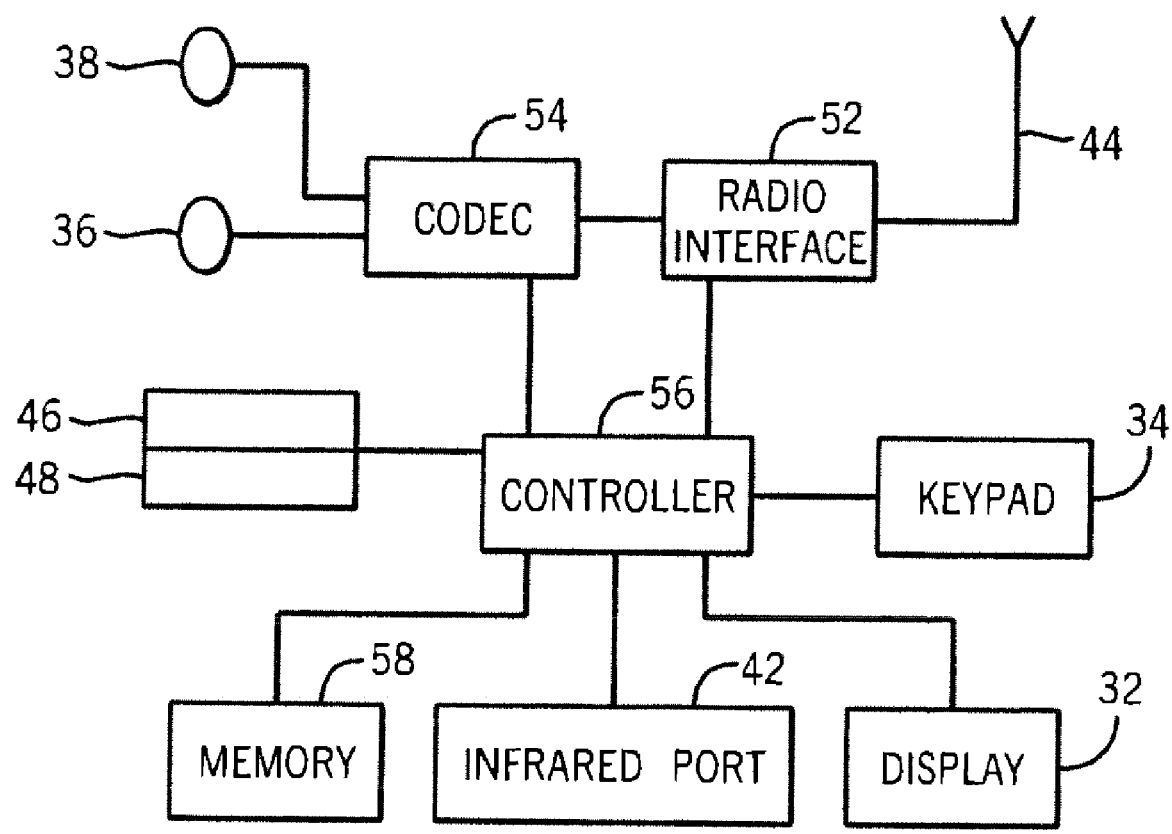
FIG. 4 is a schematic representation of a circuitry for an electronic device that can be used in conjunction with the implementation of various embodiments of the present invention.

FIG. 4 is a schematic representation of a circuitry for an electronic device that can be used in conjunction with the implementation of various embodiments of the present invention. It should be understood, however, that the present invention is not intended to be limited to one particular type of device. The electronic device of FIG. 4 includes a display 32 in the form of a liquid crystal display, a keypad 34, a microphone 36, an ear-piece 38, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type known in the art The various embodiments of the present invention described herein is described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation. To the extent that individual references, including issued patents, patent applications, and non-patent publications, are described or otherwise mentioned herein, such references are not intended and should not be interpreted as limiting the scope of the following claims.

The foregoing description of embodiments of the present invention have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated.

What is claimed is:

1. A method comprising:
   selecting, using a scheduling Media Access Control (MAC) protocol, a schedule of time slots and opportunities for encoding multiple data packets into composite data packets, the time slots configured for allocation to nodes of a mesh network, and the time slots being for transmission of data packets within the mesh network, wherein the selecting includes:
      assigning a gain to each data packet for transmission based upon the number of packets that are transmitted concurrently,
      determining a plurality of schedule permutations, and
      choosing the schedule from the plurality of schedule permutations that minimizes a total of the assigned gains over a scheduling horizon; and transmitting the schedule.

2. The method of claim 1, wherein communication in the mesh network conforms to an Institute of Electrical and Electronics Engineers (IEEE) 802.16 standard.

3. The method of claim 1, wherein the selecting is performed as part of a centralized algorithm.

4. The method of claim 1, wherein the selecting is performed as part of a distributed algorithm.

5. The method of claim 1, wherein the scheduling MAC protocol indicates which data packets to encode with each other into the composite data packets.

6. The method of claim 1, wherein the gain is one for a non-encoded operation and two or more for an encoded operation.

7. The method of claim 1, further comprising using each node in the mesh network to buffer, encode and decode the data packets.

8. An apparatus comprising:
   a controller; and
   a memory including computer executable instructions configured to, with the controller, cause the apparatus at least to:
   select, using a scheduling Media Access Control (MAC) protocol, a schedule of time slots and opportunities for encoding multiple data packets into composite data packets, the time slots configured for allocation to nodes of a mesh network, and the time slots being for transmission of data packets within the mesh network, wherein the selecting includes:
   assigning a gain to each data packet for transmission based upon the number of packets that are transmitted concurrently,
   determining a plurality of schedule permutations, and
   choosing the schedule from the plurality of schedule permutations that minimizes a total of the assigned gains over a scheduling horizon; and transmit the schedule.

9. The apparatus of claim 8, wherein communication in the mesh network conforms to an Institute of Electrical and Electronics Engineers (IEEE) 802.16 standard.

10. The apparatus of claim 8, wherein the selecting is performed as part of a centralized algorithm.

11. The apparatus of claim 8, wherein the selecting is performed as part of a distributed algorithm.

12. The apparatus of claim 8, wherein the scheduling MAC protocol indicates which data packets to encode with each other into the composite data packets.

13. The apparatus of claim 8, wherein the gain is one for a non-encoded operation and two or more for an encoded operation.

14. A non-transitory computer readable medium storing computer executable instructions configured to, when executed, cause an apparatus at least to:

select, using a scheduling Media Access Control (MAC) protocol, a schedule of time slots and opportunities for encoding multiple data packets into composite data packets, the time slots configured for allocation to nodes of a mesh network, and the time slots being for transmission of data packets within the mesh network, wherein the selecting includes:

assigning a gain to each data packet for transmission based upon the number of packets that are transmitted concurrently, determining a plurality of schedule permutations, and choosing the schedule from the plurality of schedule permutations that minimizes a total of the assigned gains over a scheduling horizon; and transmit the schedule.

15. The non-transitory computer readable medium of claim 14, wherein communication in the mesh network conforms to an Institute of Electrical and Electronics Engineers (IEEE) 802.16 standard.

16. The non-transitory computer readable medium of claim 14, wherein the selecting is performed as part of a centralized algorithm.

17. The non-transitory computer readable medium of claim 14, wherein the selecting is performed as part of a distributed algorithm.

18. The non-transitory computer readable medium of claim 14, wherein the scheduling MAC protocol indicates which data packets to encode with each other into the composite data packets.

19. The non-transitory computer readable medium of claim 14, wherein the gain is one for a non-encoded operation and two or more for an encoded operation.

* * * * *